United States Patent
McDonnell et al.

(10) Patent No.: US 10,023,190 B2
(45) Date of Patent: Jul. 17, 2018

(54) METHOD AND CONTROL FOR OPERATING A TRANSMISSION IN NEUTRAL

(71) Applicant: Ford Global Technologies, LLC, Dearborn, MI (US)

(72) Inventors: Alexander Phillip McDonnell, Dexter, MI (US); Stephen Michael Cicala, Dearborn Heights, MI (US); Charles William Suter, South Lyon, MI (US); Bradley Dean Riedle, Northville, MI (US); Leonidas Kiliaris, Southgate, MI (US); Markian Oleh Diakiw, Livonia, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 15/337,540

(22) Filed: Oct. 28, 2016

(65) Prior Publication Data
US 2018/0118214 A1    May 3, 2018

(51) Int. Cl.
| | |
|---|---|
| *F16H 3/66* | (2006.01) |
| *F16H 61/02* | (2006.01) |
| *F16H 59/18* | (2006.01) |
| *B60W 30/18* | (2012.01) |
| *B60W 10/06* | (2006.01) |
| *B60W 10/115* | (2012.01) |

(52) U.S. Cl.
CPC ...... *B60W 30/18054* (2013.01); *B60W 10/06* (2013.01); *B60W 10/115* (2013.01); *F16H 3/66* (2013.01); *F16H 61/0202* (2013.01); *B60W 2510/101* (2013.01); *B60W 2540/10* (2013.01); *B60W 2710/0666* (2013.01); *B60W 2710/1005* (2013.01); *F16H 59/18* (2013.01); *F16H 2200/0069* (2013.01); *F16H 2200/2012* (2013.01); *F16H 2200/2043* (2013.01); *F16H 2200/2066* (2013.01); *F16H 2200/2082* (2013.01)

(58) Field of Classification Search
CPC ................. F16H 59/18; F16H 2312/06; F16H 2312/022; F16H 2061/207; B60W 10/06; B60W 10/11; B60W 10/115; B60W 2510/101; B60W 2540/10; B60W 2710/1005
See application file for complete search history.

(56) References Cited

U.S. PATENT DOCUMENTS

| | | |
|---|---|---|
| 6,299,565 B1 | 10/2001 | Jain et al. |
| 7,211,027 B2 | 5/2007 | Sakamoto et al. |
| 7,335,132 B2 | 2/2008 | Yea |

(Continued)

*Primary Examiner* — Ramya Prakasam Burgess
*Assistant Examiner* — David R Morris
(74) *Attorney, Agent, or Firm* — James Dottavio; Brooks Kushman P.C.

(57) ABSTRACT

A vehicle powertrain includes an engine and a transmission coupled to the engine. The transmission has a first neutral state in which a first combination of clutches are engaged and a second neutral state in which a second combination of clutches are engaged. A vehicle controller is programmed to, in response to the transmission being in the first neutral state and an engine-torque request exceeding a threshold value, shift the transmission to the second neutral state.

16 Claims, 3 Drawing Sheets

(56) References Cited

U.S. PATENT DOCUMENTS

| | | | |
|---|---|---|---|
| 8,147,375 B2* | 4/2012 | Sah | B60W 10/06 477/3 |
| 8,162,796 B2 | 4/2012 | Popp et al. | |
| 8,182,390 B2* | 5/2012 | Sah | B60K 6/365 477/3 |
| 8,287,427 B2* | 10/2012 | Sah | B60W 10/02 477/3 |
| 2004/0087410 A1* | 5/2004 | Usoro | F16H 3/66 475/296 |
| 2005/0192154 A1* | 9/2005 | Sakamoto | B60W 10/06 477/109 |
| 2006/0128522 A1* | 6/2006 | Yeo | B60W 10/06 477/109 |
| 2009/0176612 A1* | 7/2009 | Popp | F16H 61/20 475/116 |
| 2010/0227735 A1* | 9/2010 | Sah | B60K 6/365 477/5 |
| 2010/0298090 A1* | 11/2010 | Sah | B60K 6/365 477/5 |
| 2011/0098152 A1* | 4/2011 | Sah | B60K 6/365 477/86 |

* cited by examiner

METHOD AND CONTROL FOR OPERATING A TRANSMISSION IN NEUTRAL

TECHNICAL FIELD

This disclosure relates to the field of automatic transmissions for motor vehicles. More particularly, the disclosure relates to controls and methods for operating the clutches of the transmission when in PARK or NEUTRAL to shift from one neutral state to another neutral state.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. A transmission speed ratio is the ratio of input-shaft speed to output-shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmissions are equipped with a torque converter or other type of launch device. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox. Torque is transferred from the impeller to the turbine hydrodynamically.

Automatic transmissions include several modes including PARK, REVERSE, NEUTRAL, and DRIVE. The driver selects between the different modes using an input, e.g., a shifter, located in the passenger cabin. The transmission includes clutches and brakes operable to create one or more gear ratios associated with one or more of the modes. For example, the transmission may include five forward-drive gear ratios associated with DRIVE, a single reverse gear ratio associated with REVERSE, and one or more neutral states associated with NEUTRAL and PARK.

Some transmissions are capable of having multiple neutral states in which different combinations of clutches and/or brakes are locked while still achieving NEUTRAL. U.S. Pat. No. 8,162,796 discloses this type of transmission.

SUMMARY

According to one embodiment, a vehicle powertrain includes an engine and a transmission coupled to the engine. The transmission has a first neutral state in which a first combination of clutches are engaged and a second neutral state in which a second combination of clutches are engaged. A vehicle controller is programmed to, in response to the transmission being in the first neutral state and an engine-torque request exceeding a threshold value, shift the transmission to the second neutral state.

According to another embodiment, a vehicle powertrain includes an engine and a transmission coupled to the engine. The transmission has planetary gear sets and shift actuators engageable with one or more components of the planetary gear sets. A vehicle controller is programmed to, in response to the transmission being in a first neutral state and an engine-torque request exceeding a threshold valve, disengaging at least one of the shift actuators to place the transmission in a second neutral state.

According to yet another embodiment, A method of controlling clutches of a transmission is presented. The method includes engaging a first combination of the clutches to generate a first neutral state in response to the transmission being in PARK or NEUTRAL. The method further includes disengaging one of the clutches of the first combination of clutches to generate a second neutral state in response to an engine-torque request exceeding a threshold value while the transmission is in the first neutral state.

DETAILED DESCRIPTION

Figure 1:
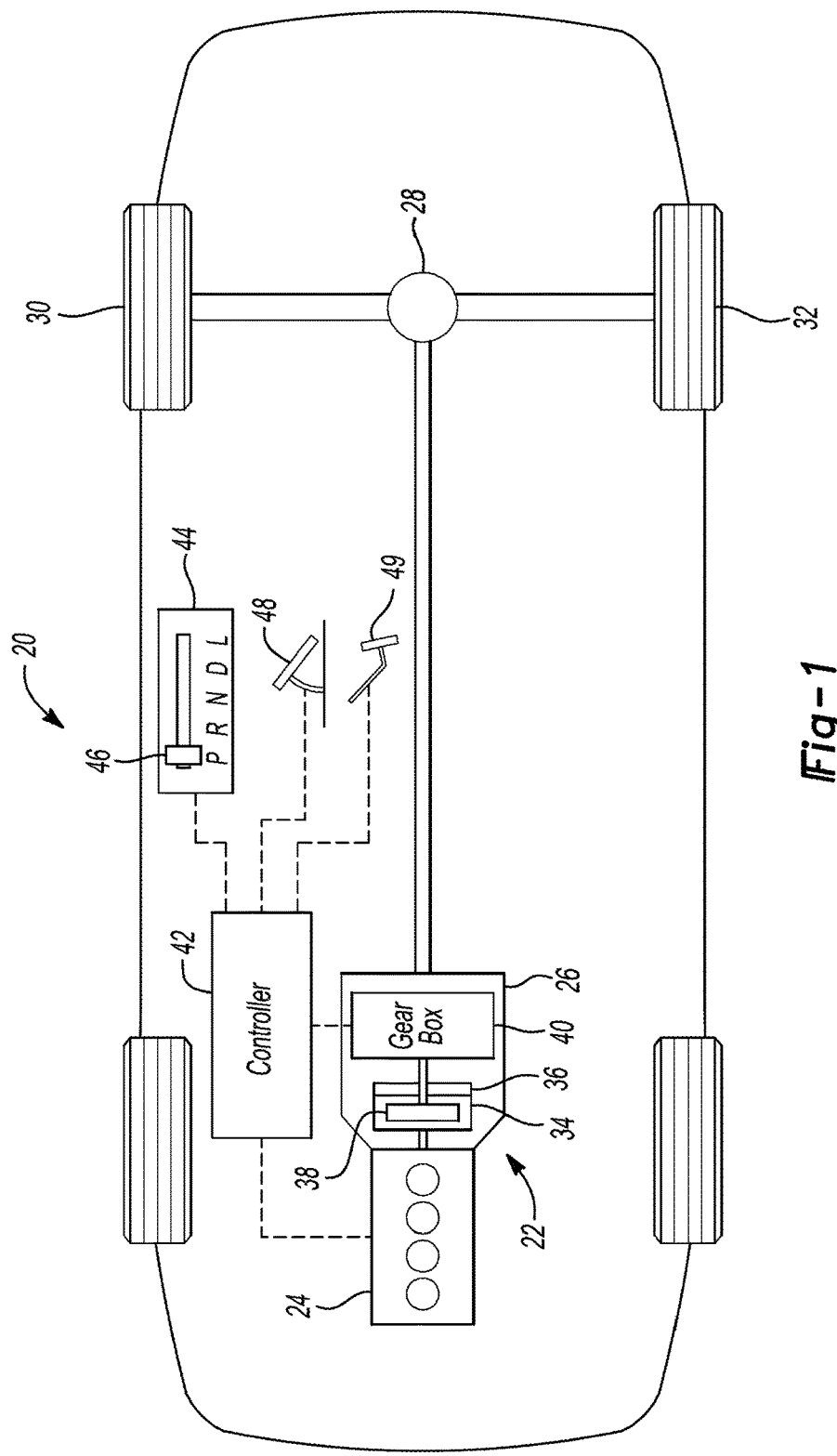
FIG. 1 is a schematic diagram of a rear-wheel-drive vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An example vehicle 20 includes a powertrain 22 having an engine 24 and a transmission 26. While illustrated as rear-wheel drive, the teachings of this disclosure are equally applicable to front-wheel drive, four-wheel drive, or all-wheel drive vehicles. The engine 24 generates mechanical power. The transmission 26 transmits the power to a differential 28 at a shaft speed suited to current vehicle needs, which may be faster or slower than the shaft speed at which the engine 24 generates the power. The differential 28 reduces the shaft speed by a fixed final-drive ratio and transmits the power to the left and right driving wheels 30 and 32, allowing for slight speed differences between the wheels as the vehicle turns a corner.

The transmission 26 may include a torque converter 34 or other launch device and a gearbox 40. The torque converter 34 includes an impeller 36 that is fixed to the engine crankshaft and a turbine 38 that is fixed to the gearbox input shaft. Torque is transferred hydro-dynamically from the impeller 36 to the turbine 38 when the impeller rotates faster than the turbine. A bypass clutch may be engaged to transfer torque by friction from the impeller 36 to the turbine 38 to reduce the power loss inherent in the hydrodynamic power transfer. The gearbox 40 includes a number of shift elements. The shift elements may be clutches. A clutch that holds an element against rotation by selectively connecting the element to the transmission housing may be called a brake. Used herein, the term "clutch" is generic and includes clutches and brakes. The gearbox 40 establishes different speed ratios by engaging various subsets of the shift elements. In some embodiments, a transmission pump provides pressurized fluid that engages the shift elements, which are hydraulically controlled by a valve body according to signals sent by the controller 42.

The controller 42 may be a vehicle-based computing system that includes one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers. An example of a vehicle-based computing system is the SYNC system manufactured by THE FORD MOTOR COMPANY.

The transmission 26 may include a manually-operated gear selector 44 (also known as a gear shifter) that includes at least PARK, REVERSE, NEUTRAL, and DRIVE positions. The gear selector 44 is linked to the transmission 26 (either electrically or mechanically) to place the transmission in the mode selected by the driver. In the example shifter 44, a lever 46 rides within a mode channel, and the driver slides the lever 46 within the channel to place the lever in the desired position, e.g., DRIVE. The PRNDL modes may be arranged in series and require the lever to move through one or more of these modes when changing a mode of the transmission. For example, shifting to PARK from DRIVE requires the lever 46 to travel through NEUTRAL and REVERSE. Of course, other types of gear shifters exist such as pushbuttons, column mounted, and turn dials. The gear shifter 44 may include a lever-position sensor configured to send a signal to the controller 42 indicative of the lever position.

An accelerator pedal 48 provides operator input to control a speed of the vehicle 20. The engine 24 has an electronically controlled throttle body. The pedal 48 may include a pedal-position sensor that provides a pedal-position signal to the controller 42, which provides control signals to the throttle body and other engine components. The controller 42 may use the pedal-position signal to determine a driver-demanded torque (also known as an engine-torque request). The driver-demanded torque may also be generated by the controller 42 independent of the pedal-position signal.

A brake pedal 49 provides operator input to control the friction brakes of the vehicle. The brake controller receives operator input through the brake pedal 49, and controls a friction brake system, which is operable to apply a braking force to the vehicle wheels. In some embodiments, the pedal 49 may include a pedal-position sensor that provides a pedal-position signal to the controller 42. In other embodiments, the brake system is purely mechanical.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission, such as transmission 26 has a shiftable gearing arrangement disposed in the gear box 40. The shiftable gearing arrangement selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches.

Figure 2:
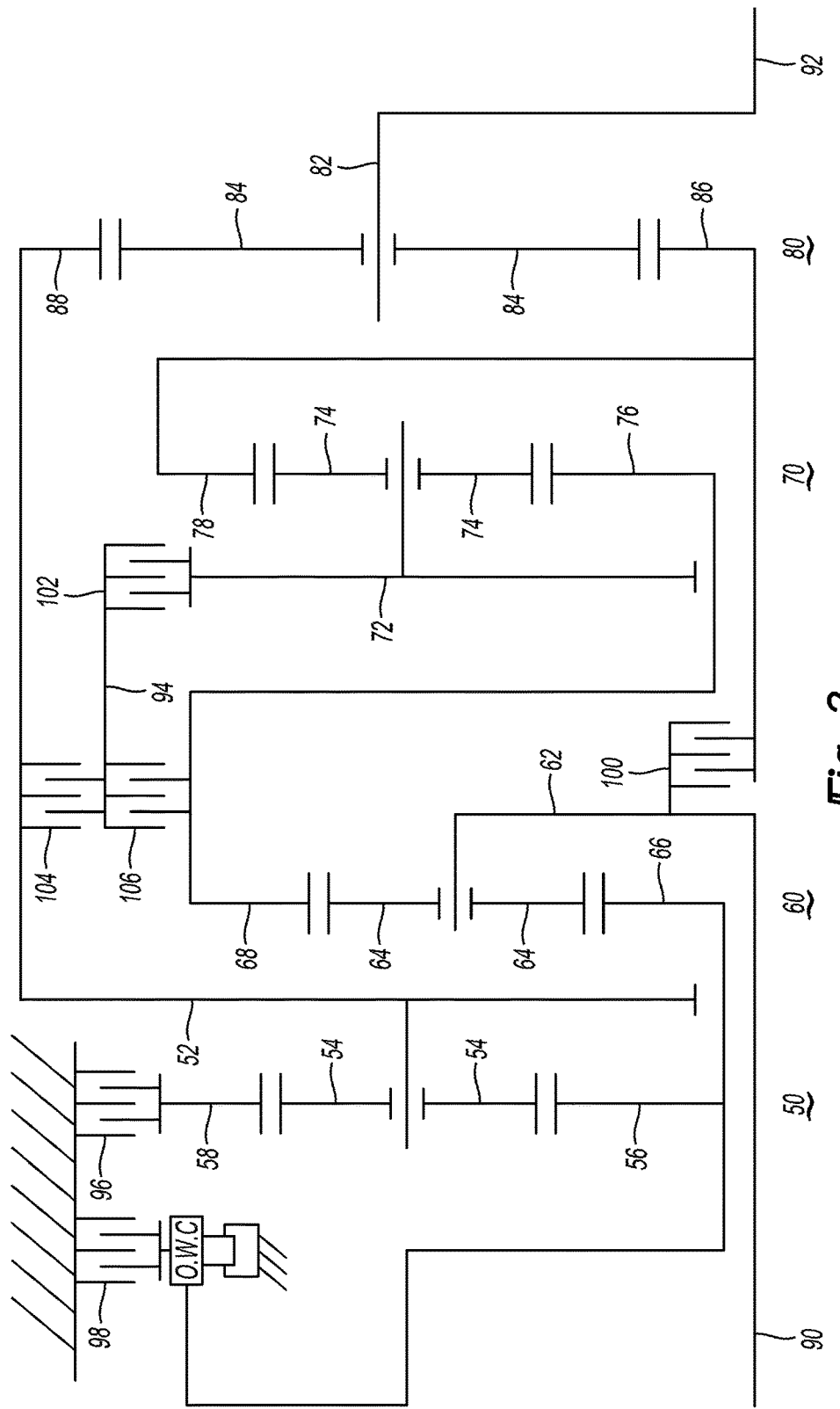
FIG. 2 is a schematic diagram of a transmission of the vehicle of FIG. 1.

The example transmission 26 is schematically illustrated in FIG. 2. The transmission 26 may utilize four simple planetary gear sets 50, 60, 70, and 80. A simple planetary gear set is a type of fixed gearing arrangement. A planet carrier 52 rotates about a central axis and supports a set of planet gears 54 such that the planet gears rotate with respect to the planet carrier. External gear teeth on the planet gears mesh with external gear teeth on a sun gear 56 and with internal gear teeth on a ring gear 58. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 60, 70, and 80 are similarly structured.

An example ratio of gear teeth for each planetary gear set is listed in Table 1.

TABLE 1

| Ring 58/Sun 56 | 2.20 |
| Ring 58/Sun 66 | 1.75 |
| Ring 58/Sun 76 | 1.60 |
| Ring 58/Sun 86 | 3.70 |

In the example transmission of FIG. 2, sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, input shaft 90 is fixedly coupled to carrier 62, and output shaft 92 is fixedly coupled to carrier 82. Ring gear 58 is selectively held against rotation by clutch 96, and sun gears 56 and 66 are selectively held against rotation by clutch 98. Input shaft 90 is selectively coupled to ring gear 78 and sun gear 86 by clutch 100. Intermediate shaft 94 is selectively coupled to carrier 72 by clutch 102, selectively coupled to carrier 52 and ring gear 88 by clutch 104, and selectively coupled to ring gear 68 and sun gear 76 by clutch 106.

As shown in Table 2, engaging the clutches in combinations of four establishes ten forward speed ratios and one reverse speed ratio between input shaft 90 and output shaft 92. An X indicates that the clutch is required to establish the speed ratio. An (X) indicates the clutch can be applied but is not required. In $1^{st}$ gear, either clutch 104 or clutch 106 can be applied instead of applying clutch 102 without changing the speed ratio. When the gear sets have tooth numbers as indicated in Table 1, the speed ratios have the values indicated in Table 2.

TABLE 2

|  | 96 | 98 | 100 | 102 | 104 | 106 | Ratio | Step |
|---|---|---|---|---|---|---|---|---|
| Rev | X | X |  | X | X |  | −4.79 | 102% |
| $1^{st}$ | X | X | X | (X) |  |  | 4.70 |  |
| $2^{nd}$ | X | X |  | X |  | X | 2.99 | 1.57 |
| $3^{rd}$ | X |  | X | X |  | X | 2.18 | 1.37 |
| $4^{th}$ | X |  |  | X | X | X | 1.80 | 1.21 |
| $5^{th}$ | X |  | X |  | X | X | 1.54 | 1.17 |
| $6^{th}$ | X |  |  | X | X | X | 1.29 | 1.19 |
| $7^{th}$ |  |  | X | X | X | X | 1.00 | 1.29 |
| $8^{th}$ |  | X | X | X | X |  | 0.85 | 1.17 |
| $9^{th}$ |  | X | X |  | X | X | 0.69 | 1.24 |
| $10^{th}$ |  | X |  | X | X | X | 0.64 | 1.08 |

The transmission 26 also includes several neutral states that each has a unique combination of engaged shift elements. Table 3 shows several possible neutral states. Table 3 is not an exhaustive list of all of the possible neutral states of the transmission 26.

TABLE 3

| Neutral State | 96 | 98 | 100 | 102 | 104 | 106 |
|---|---|---|---|---|---|---|
| 1 |  | X | X | X |  |  |
| 2 |  | X | X |  |  |  |
| 3 | X |  | X |  |  |  |
| 4 |  |  |  |  |  |  |

The transmission 26 may shift between the various neutral states when the transmission is in PARK or NEUTRAL depending upon operating conditions. This type of shift may be referred to as a neutral-to-neutral shift (N2N shift).

In some neutral states, engine acceleration will create more than nominal torque at the output shaft due to inertia coupling. The different neutral states may have different inertia-coupling values. In some neutral states, especially neutral states that have three engaged clutches, the inertia coupling is large enough to create a reactionary force sufficient to produce a momentary torque impulse at the output shaft. While this torque is generally insufficient to propel the vehicle, this torque may produce noticeable movement of the vehicle while in NEUTRAL, e.g., rocking of the vehicle. The output torque is proportional to the acceleration rate of internal transmission components which are proportional to input torque, i.e., engine torque plus or minus losses. Thus, when engine torque is low, noticeable movement is not created, but when engine torque is high, noticeable movement may be created in some neutral states.

In the example transmission 26, Neutral State 1 has three engaged clutches (96, 98, and 102). Engagement of a fourth clutch places the transmission in drive or reverse. Due to this and other factors, Neutral State 1 has a higher inertia-coupling value than the other neutral states, which have two or fewer engaged clutches. When in Neutral State 1, noticeable movement of the vehicle may be produced when the driver-demanded torque exceeds a threshold value. In real world terms, the vehicle may rock or pitch in response to a driver revving the engine when in Neutral state 1. In the example transmission, Neutral States 2, 3, and 4 will not produce more than nominal output shaft torque in response to acceleration of the engine. Thus, unwanted torque at the output shaft can be avoided by preforming an N2N shift from Neutral State 1 to one of the other neutral states in response to engine acceleration and/or driver-demanded torque exceeding a threshold value.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
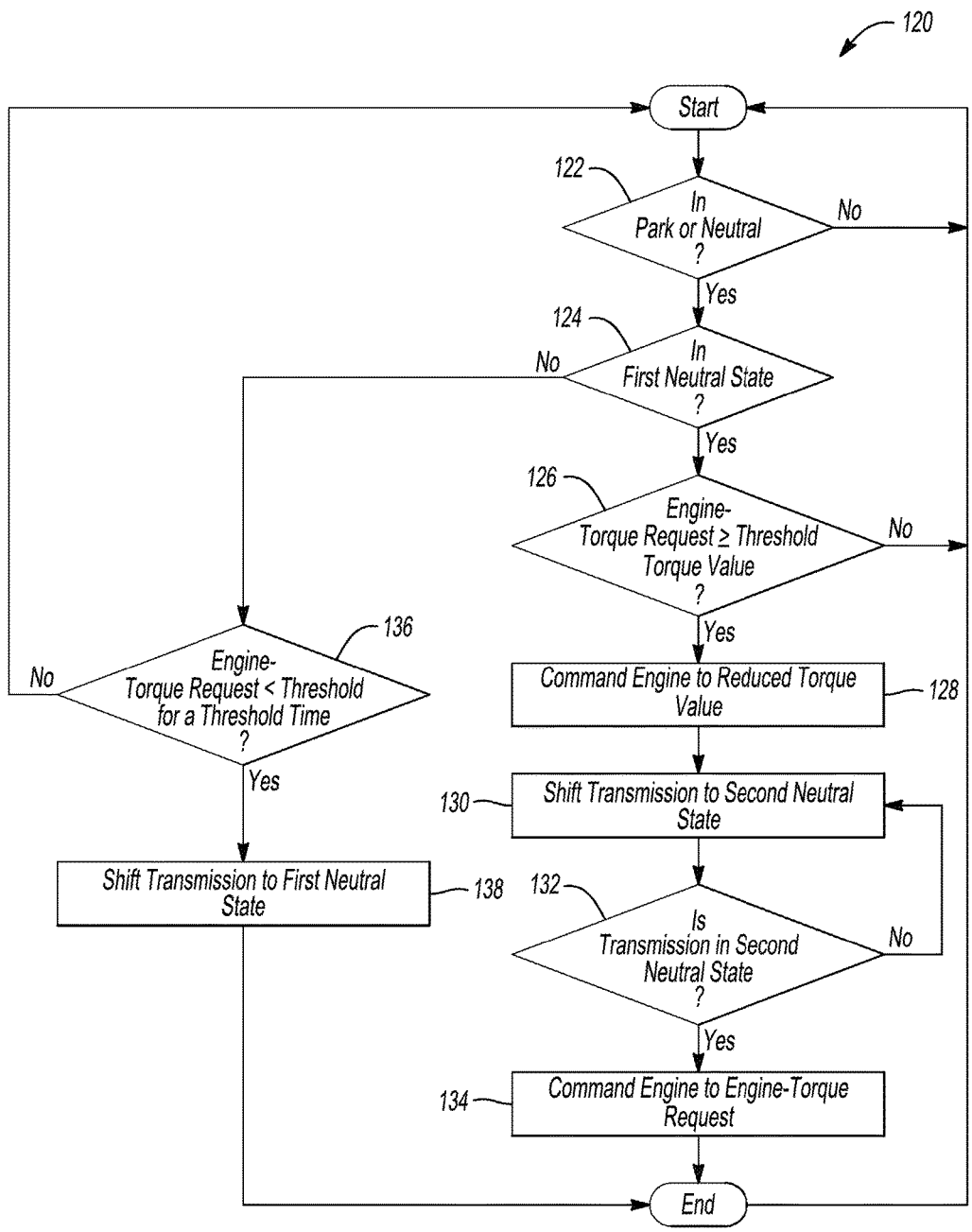
FIG. 3 is a flow chart illustrating an algorithm for controlling the transmission.

FIG. 3 illustrates an example algorithm 120 for controlling the transmission 26. At operation 122 the controller determines if the transmission is in PARK or NEUTRAL. If no, control loops back to the start. If yes, control passes to operation 124 and the controller determines if the transmission is in a first neutral state. The first neutral state may be the neutral state having the highest inertia-coupling value. For transmission 26, the first neutral state is Neutral State 1.

If the transmission is in the first neutral state control passes to operation 126, and the controller determines if an engine-torque request is greater than or equal to a threshold torque value. The engine-torque request may be a driver-demanded torque that is calculated using the pedal-position sensor. Or, the engine-torque request may be requested by the controller, such as if the vehicle is an autonomous or semiautonomous vehicle. The threshold-torque value may be based on the engine torque required to create more than nominal torque at the output shaft while in the first neutral state. In other embodiments, the controller may measure and compare engine speed to a threshold speed rather than comparing torques. Of course, torque and engine speed acceleration are mathematically related so comparing engine torque to a torque threshold is the equivalent of comparing engine speed acceleration to an acceleration threshold.

If the engine torque request is less than the threshold value the transmission remains in the first neutral state and control loops back to the start. If the engine-torque request is greater than or equal to the threshold value control passes to operation 128, and the controller commands the engine to a reduced torque value. The reduced torque value may be set to a maximum value based on transmission fluid temperature, pedal position, or other dynamic observations. The engine torque is reduced in preparation for an N2N shift and to limit output-shaft torque to prevent movement of the vehicle.

At operation 130 the controller commands the transmission to shift to a second neutral state. The second neutral state has a lower inertia-coupling value than the first neutral state. For transmission 26, the second neutral state may be any one of Neutral States 2, 3, or 4. Different second neutral states may be chosen based on operating conditions of the transmission. In some embodiments, it is advantageous to disengage the least amount of clutches as possible because it allows for the transmission to shift from NEUTRAL to DRIVE (or REVERSE) faster. For example, at operation 130 the transmission may disengage clutch 102 to shift to Neutral State 2, which can be shifted to DRIVE (or REVERSE) faster than Neutral States 3 and 4.

In operation 132 the controller determines if the transmission has achieved the second neutral state, i.e., the N2N shift is complete. Several different methods may be used to determine this. The controller may simply use a timer. Or, the controller may measure clutch slip, clutch torque or hydraulic clutch pressure. Once the N2N shift is complete, the controller stops limiting engine torque and commands the engine to the engine-torque request at operation 134.

If the transmission is not in the first neutral state at operation 124 control passes to operation 136, and the controller determines if an engine-torque request is less than a threshold torque for a threshold time. This step may be used to determine if the driver is done revving the engine. For example, if the driver has not revved the engine within the last five seconds, then it may be assumed that he is done revving the engine and the transmission has the option of shifting back to the first neutral state, which has the fastest response time from shifting from NEUTRAL to DRIVE or REVERSE. If the answer to test block 136 is yes, the transmission is shifted to the first neutral state at operation 138.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A vehicle powertrain comprising:
a transmission including first and second neutrals having different combinations of engaged clutches; and
a controller programmed to
responsive to, the transmission being in the first neutral and an engine-torque request exceeding a threshold value, shift the transmission to the second neutral, and
responsive to, the transmission being in the first neutral and the engine-torque request exceeding the threshold value, limit engine torque to a magnitude less than the engine-torque request.

2. The vehicle powertrain of claim 1, wherein the controller is further programmed to shift the transmission back to the first neutral in response to the engine-torque request being below a second threshold value.

3. The vehicle powertrain of claim 2, wherein the transmission is shifted back to the first neutral after the engine-torque request is below the second threshold value for a threshold amount of time.

4. The vehicle powertrain of claim 1, wherein the controller is further programmed to:
increase engine torque to a magnitude substantially equal to the engine-torque request in response to the transmission being in the second neutral.

5. The vehicle powertrain of claim 1, wherein the first neutral has a first number of clutches engaged, and the second neutral has a second number of clutches engaged that is less than the first number.

6. The vehicle powertrain of claim 1, wherein the second neutral has a smaller inertia-coupling value than the first neutral.

7. A vehicle powertrain comprising:
a transmission including shift actuators engageable with planetary gear sets; and
a controller programmed to,
responsive to, the transmission being in a first neutral and an engine-torque request exceeding a threshold, disengage at least one of the shift actuators to place the transmission in a second neutral, and
limit engine torque below the engine-torque request responsive to the transmission being in the first neutral and the engine-torque request exceeding the threshold.

8. The vehicle powertrain of claim 7, wherein the controller is further programmed to re-engage at least one of the shift actuators to shift the transmission back into the first neutral in response to the engine-torque request being below a second threshold value.

9. The vehicle powertrain of claim 7, wherein the controller further programmed to limit the engine torque to a magnitude less than the engine- torque request for a predefined time.

10. The vehicle powertrain of claim 7, wherein the controller is further programmed to increase the engine torque to a magnitude substantially equal to the engine-torque request in response to the transmission being in the second neutral.

11. The vehicle powertrain of claim 7, wherein the first neutral has a larger inertia-coupling value than the second neutral.

12. The vehicle powertrain of claim 7, wherein the engine-torque request is based on a pedal position of an accelerator pedal.

13. A method of controlling clutches of a transmission, the method comprising:
engaging a first combination of the clutches to generate a first neutral state in response to the transmission being in PARK or NEUTRAL; and
disengaging one of the clutches of the first combination of clutches to generate a second neutral state in response to an engine-torque request exceeding a threshold value while the transmission is in the first neutral state; and
shifting the transmission to the first neutral state in response to a gear selector being actuated by a driver.

14. The method of claim 13 further comprising limiting engine torque to a magnitude less than the engine-torque request in response to the transmission being in the first neutral state and the engine-torque request exceeding the threshold value.

15. The method of claim 14 further comprising increasing engine torque to a magnitude substantially equal to the engine-torque request in response to the transmission being in the second neutral state.

16. The method of claim 13 further comprising re-engaging the one of the clutches to shift the transmission back into the first neutral state in response to the engine-torque request being below a second threshold value.

* * * * *